United States Patent [19]

Sano et al.

[11] Patent Number: 4,879,076

[45] Date of Patent: Nov. 7, 1989

[54] PROCESS FOR THE PRODUCTION OF POLYETHYLENE MATERIALS

[75] Inventors: Akira Sano, Kawasaki; Seizo Kobayashi, Yokohama; Kazuo Matsuura, Tokyo; Shigeki Yokoyama, Yokohama; Takeshi Kamiya, Kamakura, all of Japan

[73] Assignee: Nippon Oil Co., Ltd., Tokyo, Japan

[21] Appl. No.: 61,226

[22] Filed: Jun. 12, 1987

[30] Foreign Application Priority Data

Jun. 17, 1986 [JP] Japan ................................ 61-140647
Aug. 7, 1986 [JP] Japan ................................ 61-185918
Aug. 7, 1986 [JP] Japan ................................ 61-185919
Sep. 5, 1986 [JP] Japan ................................ 61-209211

[51] Int. Cl.$^4$ ........................ B29C 35/02; B29B 11/12
[52] U.S. Cl. ...................................... 264/28; 264/120; 264/122; 264/126; 264/171; 264/210.2; 264/210.7; 264/210.8; 264/211; 264/236; 264/300; 264/320; 264/331.17; 525/240; 525/73; 525/348.1; 525/352
[58] Field of Search .................. 264/210.2, 171, 210.7, 264/210.8, 300, 320, 211, 120, 206, 236, 28, 122, 126, 331.17; 525/240; 526/348.1, 352, 73

[56] References Cited

U.S. PATENT DOCUMENTS

| | | | |
|---|---|---|---|
| 3,013,003 | 12/1961 | Maragliano et al. | 264/211 |
| 3,442,837 | 5/1969 | Brotz et al. | 264/300 |
| 3,864,295 | 2/1975 | Boussely | 264/300 |
| 3,883,631 | 5/1975 | Murray | 425/327 |
| 4,107,115 | 8/1978 | Foulks, Jr. | 264/300 |
| 4,110,391 | 8/1978 | Berzen et al. | 264/120 |
| 4,436,689 | 3/1984 | Smith et al. | 264/205 |
| 4,518,552 | 5/1985 | Matsuo et al. | 264/236 |
| 4,612,148 | 9/1986 | Motooka et al. | 264/210.8 |
| 4,616,059 | 10/1986 | Motooka et al. | 264/210.8 |
| 4,643,865 | 2/1987 | Okada et al. | 264/206 |

FOREIGN PATENT DOCUMENTS

| | | | |
|---|---|---|---|
| 2400513 | 7/1974 | Fed. Rep. of Germany | 264/237 |
| 52-74682 | 6/1977 | Japan . | |
| 56-15408 | 2/1981 | Japan . | |
| 58-164627 | 9/1983 | Japan | 264/211 |
| 58-164628 | 9/1983 | Japan | 264/211 |
| 59-187614 | 10/1984 | Japan . | |
| 60-15120 | 1/1985 | Japan . | |
| 60-89333 | 5/1985 | Japan | 264/216 |
| 60-97836 | 5/1985 | Japan . | |
| 60-198220 | 10/1985 | Japan | 264/211 |

OTHER PUBLICATIONS

T. Kanamoto et al, Preprints of the Society of High Polymers, Japan, vol. 34, p. 873 (1985).
P. Smith, H. D. Chanzy and B. P. Rotzinger, Polymer (Commun.), 26, 258–260 (1985).

*Primary Examiner*—Jeffery Thurlow
*Attorney, Agent, or Firm*—Finnegan, Henderson, Farabow, Garrett

[57] ABSTRACT

A process for producing polyethylene materials is disclosed in which particulate polyethylene is drawn at lower temperatures than its melting point, the polymer having an intrinsic viscosity of 5–50 dl/g at 135° C. in decalin and resulting from the polymerization of ethylene at temperatures below the above melting point and with use of a selected catalyst. The polyethylene materials excel in mechanical strength and elastic modulus.

10 Claims, No Drawings

PROCESS FOR THE PRODUCTION OF POLYETHYLENE MATERIALS

BACKGROUND OF THE INVENTION

Field of the Invention

This invention relates to a process for the production of polyethylene materials such as of fibers, films and the like.

Prior Art

An ethylene polymer with an extremely high molecular weight of say one million or greater is generally known as ultrahigh molecular weight polyethylene hereinafter referred to as "UHMW polyethylene". Polyethylene of this type is in common use as an engineering plastic material characterized by high resistance to impact and to wear and also by self-lubrication. It has been extensively applied to hoppers, silos, gears, linings and the like for use in various industrial sectors ranging from food processing, civil engineering, chemistry, agriculture and mining to backing materials for skis and the like for use in sports and leisure supplies.

UHMW polyethylene, because of its high molecular weight, is literally too viscous for extrusion and orientation under usual molding conditions.

Japanese Patent Laid-Open Publication No. 56-15408 discloses that a gel resulting from a decalin dope of UHMW polyethylene is allowed to stretch-mold to give fibers of great strength and high elasticity. This dope however is rather low in polymer concentration, say 3 weight percent with a polymer of $1.5 \times 10^6$ in weight-average molecular weight and one weight percent with $4 \times 10^6$. From the commercial point of view, such prior art method is undesirable in that dope formation requires large amounts of solvent and much attention of polymer solubilization, entailing cost burdens and handling inconveniences.

To alleviate this problem, there have been proposed certain improved modes of molding as disclosed for instance in Japanese Patent Laid-Open Publication No. 59-187614, No. 60-15120 and No. 60-97836 and Preprints of the Society of High Polymers, Japan, vol. 34, p. 873 (1985), whereby UHMW polyethylene can be oriented at lower temperature than its melting point as by extrusion, stretching or rolling. These methods involve diluting the polymer in xylene, decalin, kerosine or the like, followed by cooling or isothermal crystallization to form a single crystal mat which is then extruded and stretched in a solid phase. Mat formation is tedious and costly.

Alternatively, it is known that UHMW polyethylene can be extruded and stretched as it is in a solid phase. This mode of molding has in many instances resulted in reduced stretching.

SUMMARY OF THE INVENTION

It has now been found that polyethylene fibers, films and sheets of excellent physical properties can be produced by a selected mode of molding from a particulate polyethylene which is obtainable by a selected polymerization reaction with a catalyst of a selected composition therefor.

It is therefore the primary object of the present invention to provide a process for producing polyethylene materials of great mechanical strength and high elastic modulus which is relatively simple and economically feasible without involving undesirable molten or dissolved polymer.

Other objects, aspects and features of the invention will be better understood from the following detailed description.

According to one important aspect of the invention, there is provided a process for producing a polyethylene material of great mechanical strength and high elastic modulus, which comprises drawing particulate polyethylene at a lower temperature than a melting point thereof, the particulate polyethylene having an intrinsic viscosity in the range of 5–50 dl/g at 135° C. in decalin and derived by polymerizing ethylene at a temperature below such melting point and in the presence of a catalyst comprising a solid component containing at least titanium and/or vanadium and an organometallic compound.

According to another important aspect of the invention, there is provided a process for producing a polyethylene material of great mechanical strength and elastic modulus, which comprises drawing particulate polyethylene of ultrahigh molecular weight at a lower temperature than a melting point thereof, the particulate polyethylene having an intrinsic viscosity in the range of 5–50 dl/g at 135° C. in decalin and resulting from at least the following two stages of polymerization reaction:

(a) a first reaction stage wherein ethylene is polymerized in a reactor with use of a composite catalyst comprising a solid component containing at least magnesium, titanium and/or vanadium and an organometallic compound and in the absence of hydrogen or in the presence of hydrogen at reduced concentration to form 50–99.5 parts by weight of an ethylene polymer having an intrinsic viscosity in the range of 12–50 dl/g at 135° C. in decalin; and (b) a second reaction stage wherein a fresh feed of ethylene is introduced into the same reactor and polymerized in the presence of hydrogen at increased concentration to form 50–0.5 parts by weight of an ethylene polymer having an intrinsic viscosity in the range of 0.1–4.9 dl/g at 135° C. in decalin.

DETAILED DESCRIPTION OF THE INVENTION

UHMW polyethylene according to the present invention has the following characteristic features (1) Enhanced moldability such as by extrusion, compression, rolling and stretching, giving high quality fibers, films and sheets.

(2) Economical feasibility.

In accordance with a first preferred embodiment of the invention, particulate polyethylene may be produced by a one-stage polymerization reaction in which ethylene may be polymerized in a solvent or in a gas phase and with use of a catalyst later described. Reaction pressures are in the range of 0–70 kg/cm$^2$G, and reaction temperatures are in the range of $-20°-+110°$ C., preferably 0°–90° C., that is lower than the melting point of the resulting polymer. Higher temperatures would lead to molten or dissolved polymer, failing to give UHMW polyethylene contemplated by the invention. Eligible solvents are organic solvents inert to Ziegler type catalysts, typical examples of which include saturated hydrocarbons such as butane, pentane, hexane, heptane, octane, cyclohexane and the like, and aromatic hydrocarbons such as benzene, toluene, xylene and the like. High-boiling solvents such as decalin, tetralin, decane, kerosine and the like may also be used to suit a particular mode of molding.

The molecular weights of the polymer may be controlled by varying the reaction temperature or pressure The reaction may for this purpose be effected in the presence of hydrogen.

The resulting polymer has an intrinsic viscosity of 5–50 dl/g as measured at 135° C. in decalin.

In a second preferred embodiment of the invention, particulate polyethylene may be produced by a multistage polymerization reaction including at least the following two stages.

The first reaction stage involves forming an ethylene homopolymer in an amount of 50–99.5 weight parts, preferably 70–99 weight parts. This homopolymer has an intrinsic viscosity of 12–50 dl/g, preferably 12–32 dl/g at 135° C. in decalin. The reaction may be effected in a reaction vessel by polymerizing ethylene in a solvent or in a gas phase and in the presence of hydrogen of 0 - about 10 mol percent and with use of a catalyst later described. Reaction pressures are in the range of 0–70 kg/cm reaction temperatures are in the range of 0°–90° C., preferably 20°–80° C. Solvents useful in the reaction are such solvents as stated with the first embodiment.

The second reaction stage involves forming an ethylene homopolymer or copolymer in an amount of 50–0.5 weight parts, preferably 30–1 weight parts. This homopolymer or copolymer has an intrinsic viscosity of 0.1–4.9 dl/g at 135° C. in decalin. The reaction may be effected in the same reaction vessel by polymerizing a fresh feed of ethylene, or by copolymerizing the latter with an alpha-olefin monomer in the presence of hydrogen of 35–95 mol percent. Reaction pressures are in the range of 0–70 kg/cm$^2$G, and reaction temperatures are in the range of 40–100° C, preferably 60–90° C. The catalyst may be replenished if necessary. Alpha-olefins suitable as comonomers include for example propylene, butene-1, 4-methylpentene-1, hexene-1, octene-1 and the like that are copolymerizable with ethylene in the presence of Ziegler type catalysts. These comonomers may be added in a small amount of 0.1–5 mol precent, and larger amounts would invite reduced molecular weight of the resulting polymer.

In addition to the foregoing two reaction stages, there may be employed an extra stage or stages in which polymer components of higher or lower molecular weights are added to provide a wide range of polyethylene products.

The resulting composite polymer has an intrinsic viscosity of 5–50 dl/g, preferably 5–30 dl/g at 135° C. in decalin.

The catalyst to be used in the invention is essentially made up of an inorganic solid catalyst component and an organometallic compound. The solid catalyst component comprises at least titanium and/or vanadium for use in the reaction of the first embodiment and at least magnesium, titanium and/or vanadium for use in the second embodiment.

Eligible titanium compounds include for example halides, alkoxy halides, alkoxides, halogen oxides and the like of titanium. Particularly preferred among these are tetravalent and trivalent compounds.

Tetravalent titanium compounds are those represented by the formula $$Ti(OR)_nX_{4-n}$$

where R is an alkyl group of 1–20 carbon atoms or an aryl or aralkyl group, X is a halogen atom, and n is $0 \leq n \leq 4$.

Specific examples include titanium tetrachloride, titanium tetrabromide, titanium tetraiodide, monomethoxytrichlorotitanium, dimethoxydichlorotitanium, trimethoxymonochlorotitanium, tetramethoxytitanium, monoethoxytrichlorotitanium, diethoxydichlorotitanium, triethoxymonochlorotitanium, tetraethoxytitanium, monoisopropoxytrichlorotitanium, diisopropoxydichlorotitanium, triisopropoxymonochlorotitanium, tetraisopropoxytitanium, monobutoxytrichlorotitanium, dibutoxydichlorotitanium, monopentoxytrichlorotitanium, monophenoxytrichlorotitanium, diplenoxydichlorotitanium, triphenoxymonochlorotitanium, tetraphenoxytitanium and the like.

Trivalent titanium compounds are those derived by reducing titanium tetrahalides such as titanium tetrachloride and titanium tetrabromide with hydrogen, aluminum, titanium or organometallic compounds of Groups I to III metals of the Periodic Table, or by reducing tetravalent alkoxytitanium halides of the formula $$Ti(OR)_mX_{4-m}$$

Where R is an alkyl group of 1–20 carbon atoms or an aryl or aralkyl group, X is a halogen atom, and m is $0<m<4$, with organometallic compounds of Groups I to III metals.

Tetravalent titanium compounds are more preferred.

Eligible vanadium compounds include for example tetravalent vanadium compounds such as vanadium tetrachloride, vanadium tetrabromide, vanadium tetraiodide, tetraethoxyvanadium and the like, pentavalent vanadium compounds such as vanadium oxytrichloride, ethoxydichlorovanadyl, triethoxyvanadyl, tributhoxyvanadyl, o-alkyl vanadate and the like, and trivalent vanadium compounds such as vanadium trichloride, vanadium triethoxide and the like.

The titanium and vanadium compounds eligible in the first embodiment may be used alone or in combination. The vanadium to titanium ratio is preferably in the range of 2:1–0.01:1.

These two transition metal compounds, either or both, may be treated with one or more electron donors such for example as ethers, thioethers, thiols, phosphines, stibines, arsines, amines, amides, ketones, esters and the like.

The transition metal compound may be suitably used in combination with a magnesium compound.

Eligible magnesium compounds include for example magnesium, magnesium hydroxide, magnesium carbonate, magnesium oxide, magnesium halides such magnesium chloride, magnesium bromide, magnesium iodide and magnesium fluoride and the like, double salts, mixed oxides, carbonates, chlorides and hydroxides each containing both a metal selected from silicon, aluminum and calcium and a magnesium atom, and those inorganic compounds derived by treatment with water, organic oxygen-containing compounds such as alcohols, phenols, ketones, aldehydes, carboxylic acids and their esters, polysiloxanes and their acid amides and the like, inorganic oxygen-containing compounds such as alkoxides and oxyacid salts of metals and the like, organic sulfur-containing compounds such as thiols, thioethers and the like, inorganic sulfur-containing compounds such as sulfur dioxide, sulfur trioxide, sulfur and the like, monocyclic or polycyclic aromatic hydrocarbons such as benzene, toluene, xylene, anthrathene, phenanthrene and the like, or halogen-containing compounds such as chlorine, hydrogen chloride, chlorides of metals, organic halides and the like.

There may also be used as solid catalyst components one or more compounds represented by the formula $$R_mMe(OR')_nX_{z-m-n}$$

where Me is one of Groups I to IV elements, z is the valence of Me, m is $0 \leq m \leq z$, n is $0 \leq n \leq z$, hence $0 \leq m+n \leq z$, X is a halogen atom, and R and R' each are a hydrocarbon moiety of an alkyl group with a carbon number of 1-20, preferably 1-8, or an aryl or aralkyl group, R and R' being the same or different.

Specific examples include $Mg(OC_2H_5)_2$, $Mg(OC_2H_5)Cl$, $B(OC_2H_5)_3$, $Al(OCH_3)_3$, $Al(OC_2H_5)_3$, $Al(On-C_3H_7)_3$, $Al(Oi-C_3H_7)_3$, $Al(On-C_4H_9)_3$, $Al(Osec-C_4H_9)_3$, $Al(Ot-C_4H_9)_3$, $Al(OC_6H_5)_3$, $Al(OC_8H_{17})_3$, $Al(OCH_3)_2Cl$, $Al(OC_2H_5)_2Cl$, $Al(OC_2H_5)Cl_2$, $Al(Oi-C_3H_7)_2Cl$, $Al(Oi-C_3H_7)Cl_2$, $Si(OC_2H_5)_4$, $Si(OC_2H_5)_3Cl$, $Si(OC_2H_5)_2Cl_2$, $Si(OC_2H_5)Cl_3$, $SiCl_4$, $CH_3SiCl_3$, $(CH_3)_2SiCl_2$, $C_2H_5SiCl_3$, $n-C_4H_9SiCl_3$, $C_8H_{17}SiCl_3$, $C_{18}H_{37}SiCl_3$, $C_6H_5SiCl_3$, $(C_6H_5)_2SiCl_2$ and the like. No particular restriction is imposed on the method of contacting these compounds with the titanium and/or vanadium compounds. Both classes of compounds may conveniently be admixed at 50°-200° C. for 5 minutes -24 hours in an organic solvent selected from inert hydrocarbons including alcohols, ethers, ketones, esters and the like, followed by removal of the solvent.

The solid catalyst component eligible in the second embodiment typically includes titanium and/or vanadium carried in conventional manner on an inorganic magnesium-containing solid compound. Specific examples of the titanium, vanadium and magnesium compounds are those referred to as with the first embodiment.

Further details of the solid catalyst component are disclosed for instance in Japanese Patent Publication No. 51-3514, 50-23864, 51-152, 52-15111, 52-11710 and 51-153 and Japanese Patent Laid-Open Publication Nos. 49-106581 and 56-95909. Modified forms of solid catalyst components may be used in the invention. One such form involves the use of a reaction product of a Grignard compound and a titanium compound as disclosed for instance in Japanese Patent Publication Nos. 50-39470, 54-12953 and 54-12954 and Japanese Patent Laid-Open Publication No. 57-79009.

Organometallic compounds according to the invention are compounds of Groups I to IV metals which are known as part components of Ziegler type catalysts. Particularly preferred are organoaluminum compounds represented by the formulae
$R_3Al$ $R_2AlX$ $RAlX_2$ $R_2AlOR$ $RAl(OR)X$ and $R_3Al_2X_3$ where R is an alkyl group of 1-20 carbon atoms or an aryl or aralkyl group, R being the same or different, and X is a halogen atom, and organozinc compounds represented by the formula $R_2Zn$ of 1-20 carbon atoms, R being the same or different.

Specific examples include triethylaluminum, triisopropylaluminum, triisobutylaluminum, tri-sec-butylaluminum, tri-tert-butylaluminum, trihexylaluminum, trioctylaluminum, diethylaluminum chloride, diisopropylaluminum chloride, diethylaluminum ethoxide, ethylaluminum sesquichloride and diethylzinc and mixtures thereof. No particular restriction is imposed on the amount of the organometallic compound to be added which is usually in the range of 0.1-1,000 times per mol of titanium and/or vanadium compound.

It has now been found that polymerization activity can be greatly enhanced in the second embodiment by contacting an alpha-olefin preferably of the above specified type with the catalyst system prior to initiation of the reaction and that this pretreatment leads to a more stable polymerization reaction. There is no particular restriction imposed on the time length and temperature of contact between the catalyst and the olefin. However, it is convenient to contact the olefin in an amount of 1-50,000 g, preferably 5-30,000 g, per gram of catalyst at 0-200° C., preferably 0-110° C., and for one minute -24 hours.

Particulate polyethylene of ultrahigh molecular weight according to the invention should have a melting point higher than preferably 138° C., more preferably 139° C., most preferably 140° C., as the peak temperature measured without heat treatment by differential scanning calorimetry with a temperature rise of 5° C./minute. Importantly, the particulate polymer should be draw-molded as it is at a temperature lower than its melting point. Melting or dissolution would produce no satisfactory results.

Drawing typically comprises extrusion stretching and tensile stretching commonly employed in the art. To attain great mechanical strength and high elastic modulus, two-stage drawing is preferred in which particulate polyethylene is first extrusion-stretched, followed by tensile stretching of the extrudate.

Extrusion stretching includes for example solid phase extrusion and rolling. Solid phase extrusion can be effected for instance with use of a solid phase extruder having a cylinder disposed therein and a die fitted at a lower portion. Particulate polyethylene after being placed in the cylinder is pre-pressed at 0.01-0.1 GPa and at 20 - lower than the melting point, preferably 90° C. - lower than the melting point, followed by extrusion at a similar temperature. The draw ratio by extrusion varies depending upon the molecular weight of polymer and the kind of catalyst and also the composition of polymer resulting from multi-stage polymerization. In such instance, the choice of dies of predetermined diameters is optional. The draw ratio is usually in the range of 2-100, preferably 3-50, more preferably 3-25, as the cylinder to die ratio in terms of cross-sectional area.

Rolling useful also as extrusion stretching can be carried out in conventional manner at a temperature similar to solid phase extrusion. One example involves passing particulate polyethylene through a pair of rolls rotating at different peripheral speeds to thereby form a film or sheet. Single-pass or multi-pass rolling may be suitably employed. The draw ratio by rolling is generally in a wide range which, however, is usually in the range of 1.2–30, preferably 1.5–20, as the length ratio after and prior to rolling.

Compression can preferably be conducted prior to solid phase extrusion or rolling. There is no particular restriction imposed on the method of compressing particulate polyethylene. In the case of solid phase extrusion, the polymer may be compressed in the above extruder into a rod-like shape at a temperature below its melting point and in a wide range of pressures, usually in the range of 10 MPa–2GPa, preferably 20–500 MPa. Where solid phase co-extrusion is desired, particulate polyethylene and a different type of polymer may be pressed together into a sheet of 0.1–2 mm thickness at a temperature below their respective melting points and at a similar pressure. In the case of rolling, particulate polyethylene may be compressed by a suitable known method into a film or sheet in which instance pressing is preferred as in co-extrusion.

Tensile stretching can be effected as by nip stretching and roll stretching at 20 - lower than the melting point, preferably 90 - lower than the melting point. Nip stretching is particularly preferred. The draw ratio by stretching varies with the molecular weight and composition of polymer, but is usually in the range of 1–100 mm/minute, preferably 5–50 mm/minute.

Polyethylene stretched articles exhibit greater strength and higher elastic modulus as the higher the draw ratio. UHMW polyethylene according to the invention is significantly high in a draw ratio of 20–60.

Polyethylene fibers, films and sheets obtainable by the process of the invention have an elastic modulus greater than 120 GPa and a tensile strength more than 2 GPa.

The present invention will now be further described by way of the following examples which should not be regarded as limiting the invention. In these examples, all intrinsic viscosities are as measured at 135° C. in decalin and all parts by weight unless otherwise noted.

EXAMPLE 1

(a) Preparation of Solid Catalyst Component

Into a 400-ml stainless steel pot having therein 25 stainless steel balls, each ½ inch in diameter, were placed 10 g of commercially available magnesium chloride anhydride and 1.7 g of aluminum triethoxide. The mixture was ball-milled in a nitrogen atmosphere at room temperature for 5 hours, followed by addition of 2.2 g of titanium tetrachloride. Ball milling was continued for further 16 hours. The resulting catalyst component had a per gram titanium content of 39 mg.

(b) Polymerization

A 2-liter stainless steel autoclave equipped with an induction stirrer was purged with nitrogen and charged with 1,000 ml of hexane, 1 mmol of triethylaluminum and 10 mg of the above catalyst component. The mixture was heated with stirring to 60° C. and the pressure in the system raised to 1.5 kg/cm$^2$G with hexane vapor pressure Ethylene was then charged to a total pressure of 10 kg/cm$^2$G, and polymerization was initiated. Ethylene was successively fed from a 5-liter ethylene metering tank to maintain the system at 10 kg/cm$^2$G. Polymerization was continued until the pressure in the ethylene tank dropped to 7 kg/cm$^2$ (first reaction stage). The resulting polymer showed an intrinsic viscosity of 18.9 dl/g.

Unreacted ethylene in the system was quickly purged, followed by charge of hydrogen to 7 kg/cm$^2$G and then of fresh ethylene to a total pressure of 10 kg/cm$^2$G. Polymerization was resumed at 60° C. Ethylene feed was continued so that the system reached a total pressure of 10 kg/cm$^2$G. Polymerization was continued until the pressure in the ethylene tank dropped to 3 kg/cm$^2$ (second reaction stage).

The polymer slurry was taken into a beaker, after which hexane was vacuum-evaporated to give 62 g of white polyethylene. The amount of polymer was 70 parts in the first stage and 30 parts in the second stage. The composite polymer had an intrinsic viscosity of 11.7 dl/g.

(c) Solid Phase Extrusion and Tensile Stretching

Into a partly modified Instron capillary rheometer fitted with a cylinder of 0.9525 cm in inside diameter and also with a die of 0.39 cm in inside diameter and of 1 cm in length was placed about 10 g of the polymer obtained in this Example, followed by compression under conditions of temperature 90° C., pressure 0.01 GPa and time 10 min. Extrusion was then effected under conditions of temperature 90° C., speed 0.06 cm/min, pressure as tabulated and draw ratio 6. The draw ratio by extrusion was defined as the cylinder to die ratio in terms of cross-sectional area.

The resulting extrudate was stretch-molded with a tensile tester equipped with a temperature-constant chamber. Molding was possible under conditions of temperature 120° C., crosshead speed 40 mm/min and draw ratio 35. The physical properties of the molded piece were measured by a suitable known method and with the results shown in Table 1 below.

COMPARATIVE EXAMPLE 1

The procedure of Example 1 was followed except that compression was effected under conditions of temperature 200° C., pressure 0.02 GPa and time 15 min. The resulting extrudate was examined for stretch moldability under the conditions of Example 1(c), but the molded piece showed an extremely reduced draw ratio with the results tabulated.

EXAMPLE 2

The procedure of Example 1 was followed except that the pressure drop in the ethylene tank was 9.0 kg/cm$^2$ in the first reaction stage and 1.0 kg/cm$^2$ in the second stage, thereby giving 63 g of white polyethylene. The amount of polymer was 90 parts in the first stage and 10 parts in the second stage. The composite polymer had an intrinsic viscosity of 15.1 dl/g.

Extrusion and stretch moldability of the polymer was tested under the conditions of Example 1(c). Molding was possible with the results tabulated.

EXAMPLE 3

The procedure of Example 1 was followed except that the pressure drop in the ethylene tank was 8.0 kg/cm$^2$ in the first reaction stage and 2.0 kg/cm$^2$ in the second reaction stage, thereby giving 62 g of white polyethylene The amount of polymer was 80 parts in the first stage and 20 parts in the second stage. The composite polymer had an intrinsic viscosity of 13.0 dl/g.

The polymer was tested for extrusion and stretch moldability under the conditions of Example 1(c). Molding was possible with the results tabulated.

EXAMPLE 4

(a) Preparation of Solid Catalyst Component

The procedure of Example 1(a) was followed except that 2.2 g of aluminum triethoxide was used in combination with 3.2 g of silicon tetraethoxide. The resulting catalyst component had a per gram titanium content of 32 mg.

(b) Polymerization

An autoclave similar to that used in Example 1(b) was charged with 1,000 ml of hexane, 2 mmol of diethylaluminum chloride and 10 mg of the catalyst component prepared as above. The mixture was heated with stirring to 40° C. and the pressure in the system raised to 1.3 kg/cm$^2$G with hexane vapor pressure. Polymerization was initiated with ethylene charged to a total pressure of 10 kg/cm$^2$G. Ethylene feed was continued from a 5-liter ethylene metering tank so that the system was maintained at 10 kg/cm$^2$G. Polymerization was continued until the pressure in the ethylene tank dropped to 6 kg/cm$^2$ (first reaction stage). The resulting polymer showed an intrinsic viscosity of 26.1 dl/g.

The autoclave was purged of unreacted ethylene, and the system was heated to 80° C., Hydrogen was charged to 8 kg/cm$^2$G and then fresh ethylene to a total pressure of 10 kg/cm$^2$G. Polymerization was resumed with successive ethylene feed to a total pressure of 10 kg/cm$^2$G and continued until the pressure in the ethylene tank dropped to 4 kg/cm$^2$ (second reaction stage).

The polymer slurry was put into a beaker, followed by vacuum evaporation of hexane, thereby giving 62 g of white polyethylene. The amount of polymer was 60 parts in the first stage and 40 parts in the second stage. The composite polymer had an intrinsic viscosity of 12.2 dl/g.

The polymer was tested for extrusion and stretch moldability under the conditions of Example 1(c). Molding was possible with the results tabulated.

EXAMPLE 5

(a) Preparation of Solid Catalyst Component

The procedure of Example 1(a) was followed except that 2.0 g of titanium tetrachloride was used in combination with 0.5 g of triethoxyvanadium oxide. There were 7.6 mg of vanadium and 30.6 mg of titanium per gram of the resulting catalyst component.

(b) Polymerization

An autoclave similar to Example 1(b) was charged with 1,000 ml of hexane, 1 mmol of triethylaluminum and 10 mg of the calalyst component prepared as in this Example. The mixture was heated with stirring to 60° C. and the pressure in the system raised to 1.5 kg/cm$^2$G with hexane vapor pressure. Polymerization was initiated with a charge of ethylene to a total pressure of 10 kg/cm$^2$G. Ethylene was successively fed from a 5-liter ethylene metering tank to maintain the system at 10 kg/cm$^2$G. Polymerization was continued until the pressure in the ethylene tank dropped to 7 kg/cm$^2$ (first reaction stage). The resulting polymer showed an intrinsic viscosity of 20.5 dl/g.

The autoclave was quickly purged of unreacted ethylene and charged with hydrogen to 7 kg/cm$^2$G and then fresh ethylene to a total pressure of 10 kg/cm$^2$G. Polymerization was resumed with successive ethylene feed to a total pressure of 10 kg/cm$^2$G and continued until the pressure in the ethylene tank dropped to 3 kg/cm$^2$ (second reaction stage).

The polymer slurry was taken into a beaker, and hexane was then removed in vacuum to give 60 g of white polyethylene. The amount of polymer was 70 parts in the first stage and 30 parts in the second stage. The composite polymer had an intrinsic viscosity of 13.8 dl/g.

The polymer was tested for extrusion and stretch moldability under the conditions of Example 1(c). Molding was possible with the results tabulated.

EXAMPLE 6

The procedure of Example 2 was followed except that polymerization temperature was reduced to 20° C. in the first reaction stage. The resulting composite polymer had an intrinsic viscosity of 30.1 dl/g.

Moldability tests were conducted under the conditions of Example 1(c). Molding was possible with the results tabulated.

TABLE 1

| run | draw ratio solid phase extrusion | extrusion pressure (GPa) | tensile stretching | elastic modulus (GPa) | tensile strength (GPa) |
|---|---|---|---|---|---|
| Example | | | | | |
| 1 | 6 | 0.14 | 35 | 138 | 2.5 |
| 2 | 6 | 0.16 | 28 | 121 | 2.3 |
| 3 | 6 | 0.15 | 32 | 130 | 2.5 |
| 4 | 6 | 0.18 | 32 | 128 | 2.6 |
| 5 | 6 | 0.15 | 25 | 122 | 2.2 |
| 6 | 6 | 0.20 | 26 | 125 | 2.9 |
| Comparative Example | | | | | |
| 1 | 6 | 0.10 | 2.5 | 12 | 0.3 |

EXAMPLE 7

(a) Production of UHMW Polyethylene

An autoclave similar to Example 1(b) was purged with nitrogen and charged with 1,000 ml of hexane, 10 mmol of diethylaluminum chloride and a catalyst component resulting from the reaction of 0.5 mmol of titanium tetrachloride with 0.5 mmol of propylene oxide in 50 ml of hexane at room temperature for 30 minutes. The mixture was heated with stirring to 60° C. Ethylene was then charged to a total pressure of 10 kg/cm$^2$G, and polymerization was initiated. Ethylene was successively fed to maintain the system at 10 kg/cm$^2$G. Polymerization was continued for 3 hours.

The polymer slurry was put into a beaker, followed by decomposition of the catalyst with a hydrochloric acid-methanol solution. Subsequent hexane washing and vacuum drying gave 120 g of white polyethylene having an intrinsic viscosity of 32 dl/g.

The polymer showed a melting point (peak temperature) of 141.0° C. as measured without heat treatment by differential scanning calorimetry with temperature rise 5° C./min (DSC-20 calorimeter, manufactured by Seiko Denshi Kogyo K. K.).

(b) Rolling and Tensile Stretching

The polymer obtained in this Example was pressed at 125° C. and at 0.02 GPa into a 0.2 mm thick film which was then passed at 130° C. through a pair of counter-rotating rollers each dimensioned to be 100 mm in diameter and 500 mm in crosswise length and having different peripheral speeds, thereby forming a film drawn at a ratio of 6.

Stretch moldability of the resulting film was tested with a tensile tester similar to Example 1(c) and under conditions of temperature 120° C. and crosshead speed 40 mm/min. Molding was possible at a draw ratio of 20 with the physical properties shown in Table 2.

COMPARATIVE EXAMPLE 2

The procedure of Example 7 was followed except that the rolling temperature was elevated to 200° C. beyond the melting point of the polymer formed.

The resulting film was examined for stretch moldability under the conditions of Example 7(b) and with the results tabulated. The molded piece showed a draw ratio of only 1.3, meaning that it failed to exhibit its characteristics as being a highly strong and elastic polyethylene material.

COMPARATIVE EXAMPLE 3

The procedure of Example 7 was followed except that compression was effected prior to rolling with temperature 200° C., pressure 0.02 GPa and time 15 min. The test piece so compressed showed a melting point of 132.5° C.

Rolling and stretch moldability of the resulting rolled film was examined under the conditions of Example 7(b) and with the results tabulated.

EXAMPLE 8

The procedure of Example 7 was followed except that the polymerization temperature was elevated to 80° C., thereby giving polyethylene with a melting point of 140.8° C. and an intrinsic viscosity of 18.0 dl/g.

Moldability tests were conducted under the conditions of Example 7(b). Molding was possible with the results tabulated.

TABLE 2

| run | ratio rolling | tensile stretching | elastic modulus (GPa) | tensile strength (GPa) |
|---|---|---|---|---|
| Example 7 | 6 | 20 | 130 | 3.6 |
| Comparative Example 2 | 6 | 1.3 | 18 | 1.3 |
| 3 | 6 | 3.0 | 20 | 0.5 |
| Example 8 | 6 | 20 | 125 | 2.8 |

(a) Preparation of Solid Catalyst Component

Into a pot similar to Example 1(a) were placed 10 g of commercially available magnesium chloride anhydride and 4.3 g of aluminum triethoxide. The mixture was ball-milled in a nitrogen atmosphere at room temperature for 5 hours, followed by addition of 2.7 g of titanium tetrachloride. Ball milling was continued for further 16 hours. The resulting catalyst component had a per gram titanium content of 40 mg.

(b) Polymerization

An autoclave similar to Example 1 (b) was purged with nitrogen and charged with 1,000 ml of hexane, 1 mmol of triethylaluminum and 10 mg of the catalyst component prepared as above. The mixture was heated with stirring to 70° C. and the pressure in the system raised to 1.6 kg/cm$^2$G with hexane vapor pressure. Ethylene was then charged to a total pressure of 10 kg/cm$^2$G, and polymerization was initiated. Ethylene feed was continued to maintain the system at 10 kg/cm$^2$G. Polymerization was effected for 20 minutes.

The polymer slurry was poured into a beaker, after which hexane was vacuum-evaporated, thereby giving 72 g of white polyethylene having an intrinsic viscosity of 15.2 dl/g and a melting point of 141.0° C.

(c) Solid Phase Extrusion and Tensile Stretching into an Instron rheometer similar to Example 1(c) was put above 5 g of the polymer obtained in this Example, followed by compression under conditions of temperature 120° C., pressure 0.02 GPa and time 10 min and then by extrusion under conditions of temperature 130° C., speed 0.24 cm/min, pressure as tabulated and draw ratio 4.

The extrudate was stretch-molded with a tensile tester similar to Example 1(c) and under conditions of temperature 120° C. and crosshead speed 40 mm/min. Molding was possible at a draw ratio of 25 with the physical properties shown in Table 3.

COMPARATIVE EXAMPLE 4

The procedure of Example 9 was followed except that the extrusion temperature was elevated to 200° C.

The extrudate was examined for stretch moldability under the conditions of Example 9(c), but the molded piece revealed reduced draw ratio with the physical properties tabulated.

EXAMPLE 10

The procedure of Example 9 was followed except that a die of 0.28 cm in inside diameter and 1 cm in length was used, thereby giving an extrudate drawn at a ratio of 12.

Stretch moldability of the extrudate was tested under the conditions of Example 9(c). Molding was possible with the results tabulated.

EXAMPLE 11

(a) Preparation of Solid Catalyst Component

The procedure of Example 9(a) was followed except that 2.2 g of aluminum triethoxide was used in combination with 3.2 g of silicon tetraethoxide. The resulting catalyst component had a per gram titanium content of 32 mg.

(b) Polymerization

An autoclave similar to Example 9(b) was charged with 1,000 ml of hexane, 1 mmol of triethylaluminum and 10 mg of the above catalyst component. The mixture was heated with stirring to 60° C. and the pressure in the system raised to 1.5 kg/cm$^2$G with hexane vapor pressure. Ethylene was charged to a total pressure of 10 kg/cm$^2$G, and polymerization was initiated. With successive ethylene feed to maintain the system at 10 kg/cm$^2$G, polymerization was continued for 30 minutes.

The polymer slurry was put into a beaker, after which hexane was vacuum-evaporated to give 75 g of white polyethylene having an intrinsic viscosity of 18.9 dl/g.

(c) Solid Phase Extrusion and Tensile Stretching

The above polymer was tested for extrusion and stretch moldability under the conditions of Example 9(c). Molding was possible with the results tabulated.

COMPARATIVE EXAMPLE 5

The procedure of Example 11 was followed except that the extrusion temperature was elevated to 200° C.

The resulting extrudate was examined for stretch moldability under the conditions of Example 11(c) and with the results tabulated.

COMPARATIVE EXAMPLE 6

The procedure of Example 11 was followed except that compression was conducted prior to extrusion with temperature 200° C., pressure 0.02 GPa and time 15 min. The molded piece showed a melting point of 132° C.

The resulting extrudate was examined for stretch moldability under the conditions of Example 11(c) and with the results tabulated.

EXAMPLE 12

The procedure of Example 11 was followed except that a die of 0.34 cm in inside diameter and 1 cm in length was used, thereby giving an extrudate drawn at a ratio of 8.

Stretch moldability was tested under the conditions of Example 9(c). Molding was possible with the results tabulated.

EXAMPLE 13

A polymer obtained in a manner similar to Example 9(b) was pressed at 125° C. and at 0.02 GPa into a 0.2 mm thick film which was then rolled with use of the counter-rotating rolls and molding conditions of Example 7(c), thereby forming a film drawn at a ratio of 6. Stretch moldability of the resulting film was tested under the conditions of Example 7(c). Molding was possible with the results tabulated.

COMPARATIVE EXAMPLE 7

The procedure of Example 13 was followed except that the rolling temperature was elevated to 200° C. The resulting rolled film was examined for stretch moldability with the results tabulated.

EXAMPLE 14

(a) Preparation of Solid Catalyst Component

The procedure of Example 9(a) was followed except that 0.5 g of triethoxyvanadium oxide was used in combination with 2.0 g of titanium tetrachloride. There were 7.6 mg of vanadium and 30.6 mg of titanium per gram of the resulting catalyst component.

(b) Polymerization

An autoclave similar to Example 9(b) was charged with 1,000 ml of hexane, 1 mmol of triethylaluminum and 10 mg of the above catalyst component. The mixture was heated with stirring to 60° C. and the pressure in the system raised to 1.5 kg/cm$^2$G with hexane vapor pressure. Ethylene was then charged to a total pressure of 10 kg/cm$^2$G, and polymerization was initiated. Ethylene feed was continued to maintain the system at 10 kg/cm$^2$G. Polymerization was continued for 30 minutes.

The polymer slurry was poured into a beaker, followed by vacuum evaporation of hexane, thereby giving 60 g of white polyethylene having an intrinsic viscosity of 14.2 dl/g.

(c) Rolling and Tensile Stretching

The polymer prepared as above was pressed and rolled in a manner similar to Example 7(b) to thereby form a film drawn at a ratio of 4. The film was stretch-molded under the conditions of Example 7(b). Molding was possible with the results tabulated.

EXAMPLE 15

The procedure of Example 9 was followed except that the polymerization temperature was reduced to 40° C., thereby giving polyethylene whose intrinsic viscosity was 28.0 d/g.

Moldability tests were conducted under the conditions of Example 9(c). Molding was possible with the results tabulated.

TABLE 3

| run | peak temperature (DSC) (°C.) | draw ratio solid phase extrusion/ | extrusion pressure (Gpa) | tensile stretching | elastic modulus (GPa) | tensile strength (GPa) |
| --- | --- | --- | --- | --- | --- | --- |
| Example | | | | | | |
| 9 | 141.0 | 4 | 0.3 | 25 | 128 | 3.3 |
| 10 | 141.0 | 12 | 0.5 | 8 | 124 | 3.2 |
| 11 | 141.2 | 4 | 0.35 | 22 | 113 | 3.6 |
| 12 | 141.2 | 8 | 0.5 | 10 | 109 | 3.4 |
| 13 | 141.0 | 6 | rolled | 20 | 136 | 3.7 |
| 14 | 140.8 | 4 | rolled | 25 | 122 | 3.1 |
| 15 | 141.8 | 6 | 0.5 | 16 | 125 | 4.1 |
| Comparative Example | | | | | | |
| 4 | 141.0 | 4 | 0.1 | 2.0 | 15 | 0.2 |
| 5 | 141.2 | 4 | 0.1 | 1.5 | 8 | 0.3 |
| 6 | 141.2 | 4 | 0.1 | 3.7 | 18 | 0.3 |
| 7 | 141.0 | 6 | rolled | 1.3 | 19 | 0.5 |

What is claimed is:

1. A process for producing a polyethylene material of great mechanical strength and high elastic modulus, which comprises;
   (a) polymerizing ethylene at a temperature between −20° C. and 110° C. in the presence of a catalyst comprising (1) a solid component containing magnesium and vanadium and (2) an organometallic compound to produce particulate polyethylene having an intrinsic viscosity in the range of from 5 to 50 dl/g at 135° C. in decalin; and
   (b) drawing the resulting particulate polyethylene, without melting or dissolution, at a temperature lower than the melting point thereof.

2. The process of claim 1 wherein said polyethylene material has an elastic modulus greater than 120 GPa and a tensile strength more than 2 GPa.

3. The process of claim 1 wherein said particulate polyethylene has a melting point higher than 38° C.

4. The process of claim 1 wherein said drawing comprises extrusion and stretching.

5. The process of claim 1 wherein said drawing comprises compression, rolling and stretching.

6. A process for producing a polyethylene material of great mechanical strength and high elastic modulus, which comprises;
   (a) polymerizing ethylene in a first reaction stage in a reactor at a temperature in the range of from 0° C. to 90° C. in the presence of a catalyst comprising (1) a solid component containing magnesium and titanium and (2) an organometallic compound, in the absence of hydrogen or in the presence of hydrogen at reduced concentration, to from 50–99.5 parts by weight of an ethylene homopolymer having an intrinsic viscosity in the range of from 12 to 50 dl/g at 135° C. in decalin;

(b) introducing a fresh feed of ethylene into said reactor and polymerizing the fresh feed of ethylene in a second reaction stage at a temperature in the range of from 40° C. to 100° C. in the presence of hydrogen at increased concentration to from 50–0.5 parts by weight of an ethylene polymer having an intrinsic viscosity in the range of from 0.1 to 4.9 dl/g at 135° C. in decalin; and (c) drawing particular polyethylene of ultrahigh molecular weight which results from the above two stages of polymerization, without melting or dissolution, at a temperature lower than the melting point thereof, said particular polyethylene having an intrinsic viscosity in the range of 5 to 50 dl/g at 135° C. in decalin.

7. The process of claim 6 wherein said polyethylene material has an elastic modulus greater than 120 GPa and a tensile strength more than 3 GPa.

8. The process of claim 6 wherein said particulate polyethylene has an intrinsic viscosity in the range of 5–30 dl/g at 135° C. in decalin.

9. The process of claim 6 wherein said drawing comprises extrusion and stretching.

10. The process of claim 6 wherein said ethylene polymers are formed in amounts of 70–99 parts by weight in the first reaction stage and of 30–1 parts by weight in the second reaction stage.

* * * * *

UNITED STATES PATENT AND TRADEMARK OFFICE
CERTIFICATE OF CORRECTION

PATENT NO. : 4,879,076

DATED : November 7, 1989

INVENTOR(S) : Akira Sano et al.

It is certified that error appears in the above-identified patent and that said Letters Patent is hereby corrected as shown below:

Claim 1, col. 14, line 40 ";" should be --:--.

Claim 6, col. 14, line 62 ";" should be --:--.

Claim 3, col. 14, line 55: "38" should be --138--.

Claim 6, col. 15, line 13 "particular" should be --particulate--.

Claim 7, col. 16, line 6: "3" should be --2--.

Signed and Sealed this

Thirtieth Day of October, 1990

*Attest:*

HARRY F. MANBECK, JR.

*Attesting Officer*   *Commissioner of Patents and Trademarks*

UNITED STATES PATENT AND TRADEMARK OFFICE
CERTIFICATE OF CORRECTION

PATENT NO. : 4,879,076

DATED : November 7, 1989

INVENTOR(S) : Akira Sano et al.

It is certified that error appears in the above-identified patent and that said Letters Patent is hereby corrected as shown below:

Column 14, line 44:

Claim 1, line 7 "vanadium" should be --titanium--.

Signed and Sealed this

Thirty-first Day of March, 1992

Attest:

HARRY F. MANBECK, JR.

*Attesting Officer*  *Commissioner of Patents and Trademarks*